United States Patent
Leitao

(10) Patent No.: US 8,565,549 B2
(45) Date of Patent: Oct. 22, 2013

(54) IMAGE CONTRAST ENHANCEMENT

(75) Inventor: Andre Leitao, Eindhoven (NL)

(73) Assignee: NXP B.V., Eindhoven (NL)

( * ) Notice: Subject to any disclaimer, the term of this patent is extended or adjusted under 35 U.S.C. 154(b) by 635 days.

(21) Appl. No.: 12/887,358

(22) Filed: Sep. 21, 2010

(65) Prior Publication Data
US 2011/0123134 A1    May 26, 2011

(30) Foreign Application Priority Data

Sep. 22, 2009    (EP) ..................... 09171022

(51) Int. Cl.
*G06K 9/40*    (2006.01)

(52) U.S. Cl.
USPC ............ 382/274; 382/254; 382/270; 382/272

(58) Field of Classification Search
None
See application file for complete search history.

(56) References Cited

U.S. PATENT DOCUMENTS

| | | | |
|---|---|---|---|
| 6,757,442 B1 | 6/2004 | Avinash | |
| 6,954,549 B2 | 10/2005 | Kraft | |
| 2002/0181797 A1* | 12/2002 | Young | 382/260 |
| 2007/0171310 A1* | 7/2007 | Arici et al. | 348/687 |
| 2009/0034870 A1 | 2/2009 | Keshet et al. | |
| 2009/0238486 A1* | 9/2009 | Biezen et al. | 382/260 |

FOREIGN PATENT DOCUMENTS

| | | |
|---|---|---|
| EP | 1 231 564 A1 | 8/2002 |
| EP | 1 814 078 A1 | 8/2007 |
| EP | 2 073 170 A1 | 6/2009 |

OTHER PUBLICATIONS

Extended European Search Report for European Patent Appln. No. 09171022.8 (Mar. 10, 2010).

* cited by examiner

*Primary Examiner* — Matthew Bella
*Assistant Examiner* — Jason Heidemann

(57) ABSTRACT

A contrast enhancement method for an image includes extracting at least one sub-band image from the image, comprising detail information at a predetermined spatial scale; determining a first gain value for each pixel, based on pixel values of the image or the at least one sub-band image; determining a second gain value for each pixel; modifying the first gain value for each pixel using the respective second gain value; and generating an enhanced image by applying the modified first gain values to respective pixels of one or more sub-band images and combining the result with the image. Determining the first gain value for each pixel comprises: estimating a dynamic range of the pixel values in a neighbourhood of that pixel; and setting the first gain value in inverse relation to the dynamic range. Determining the second gain value for each pixel comprises: estimating a probability distribution of the pixel values in the neighbourhood; and determining the second gain value based on the amplitude of the peak of the probability distribution.

11 Claims, 4 Drawing Sheets

IMAGE CONTRAST ENHANCEMENT

This application claims the priority under 35 U.S.C. §119 of European patent application no. 09171022.8, filed on Sep. 22, 2009, the contents of which are incorporated by reference herein.

FIELD OF THE INVENTION

This invention relates to contrast enhancement for images and frames of video. In particular, it relates to a local contrast enhancement technique, in which the degree of enhancement is adapted locally.

Contrast enhancement of images and video frames (hereinafter referred to collectively as images) commonly involves analysis and modification of the histogram of luminance values. A convenient way to implement such a contrast enhancement algorithm is by applying a transfer function to the grey levels. Gamma correction is one widely used example of this. Adaptive methods, such as histogram equalization, determine the shape of the transfer function from the video signal itself. Application of histogram equalization to natural images, however, can lead to over-enhancement.

Some disadvantages of global methods such as histogram equalization can be addressed by enhancing the image contrast in a spatially localized and adaptive manner. Local contrast enhancement techniques try to enhance the visibility of local details, by amplifying the difference between the luminance value of a pixel and its local mean.

Local contrast enhancement methods have previously been proposed that use an image decomposition of some kind—either in the spatial (multi-scale) or frequency (multi-resolution) domain. This is typically followed by the application of an enhancement factor to each scale or frequency-band. However, methods of this kind can still suffer from the problem of over-enhancement.

BACKGROUND OF THE INVENTION

According to an aspect of the present invention, there is provided a contrast enhancement method for an image having a plurality of pixels, the method comprising: extracting at least one sub-band image from the image, comprising detail information at a predetermined spatial scale; determining a first gain value for each pixel, based on pixel values of the image or the at least one sub-band image; determining a second gain value for each pixel; modifying the first gain value for each pixel using the respective second gain value; and generating an enhanced image by applying the modified first gain values to respective pixels of one or more sub-band images and combining the result with the image, wherein determining the first gain value for each pixel comprises: estimating a dynamic range of the pixel values in a neighbourhood of that pixel; and setting the first gain value in inverse relation to the dynamic range, and wherein determining the second gain value for each pixel comprises: estimating a probability distribution of the pixel values in the neighbourhood; and determining the second gain value based on the amplitude of the peak of the probability distribution.

The or each sub-band image contains detail information of the input image. That is, low frequencies have been attenuated such that the frequency-content remaining is high-pass or band-pass. A sub-band image could therefore be derived by linear filtering with a suitable band-pass or high-pass filter. However, it will be understood that a variety of other linear or non-linear methods can also be used to extract or emphasize spatial variations in the pixel function and arrive at a suitable sub-band image.

The gain value represents an enhancement factor, to be applied to one or more sub-band images in order to emphasise detail information in the image and thereby enhance the contrast. The one or more sub-band images to which the gain is applied may be the same as or different from the at least one sub-band image from which the gain values can be derived. The gain can be applied by a variety of operations, including, but not limited to addition, linear scaling, and higher-order operations. Likewise, the result of applying the gain values may be combined with the input image by a variety of suitable linear or non-linear arithmetic operations.

The gain value is set in inverse relation to the dynamic range of the pixels in a local neighbourhood. This means that pixels in areas having a wide dynamic range receive relatively less enhancement than pixels in areas having a narrow dynamic range. This can prevent over-enhancement, by restricting the enhancement factor in areas of the image which already have a high degree of contrast.

The first gain value for each pixel is preferably determined based on pixel values of the at least one sub-band image.

It may be beneficial to determine the dynamic range (and hence the gain value) from the sub-band image, instead of directly from the input image. Low-frequencies are attenuated in the sub-band image. Therefore, slow variations (gentle gradients) in the pixel function have been substantially removed. As a result, the sub-band image may better capture the dynamic range of the detail information, in particular.

The method further comprises, before the step of generating the enhanced image: determining a second gain value for each pixel; and modifying the first gain value for each pixel using the respective second gain value, wherein determining the second gain value for each pixel comprises: estimating a probability distribution of the pixel values in the neighbourhood; and determining the second gain value based on the amplitude of the peak of the probability distribution.

This method provides a more sophisticated determination of the gain. The first gradient value takes into account the overall dynamic range, while the second gain value takes into account a measure of the sharpness of the probability distribution. A low amplitude peak in the probability density function corresponds to a broad variation in pixel values; a peak of high amplitude corresponds to a relatively homogenous distribution. The peak amplitude and the dynamic range can be interrelated to some extent. For example, a relatively low peak corresponding to a broad distribution will typically also have a relatively wider dynamic range. However, in general these two aspects can vary independently, because the shape of the underlying distribution can be complex. The present inventors have recognised that it is advantageous to set the enhancement factor (gain) based on both. For example, each gain value can modulate the other, so that if either the first or second gain indicates that contrast should not be enhanced, the resulting combined gain will be set low.

The second gain value is preferably determined such that: a maximum gain is set when the amplitude of the peak is at an intermediate level; a minimum gain is set when the amplitude of the peak is at a maximum level; and an intermediate gain value is set when the amplitude of the peak is at a minimum level.

According to the second gain value, maximum contrast enhancement should be applied when there is a significant variation to be enhanced. In this case, the peak of the distribution will have intermediate amplitude. This corresponds, for example, to a bi-modal distribution. Totally homogenous areas of the image will give rise to a relatively large peak in the distribution. These areas should receive minimal enhancement, because there is no detail to emphasize. A flat distribution will have the lowest possible peak amplitude, and will correspond to an area of the image which already has a relatively high level of detail and contrast. Contrast enhancement in such regions should be moderate.

The estimate of the probability distribution may comprise a histogram.

The dynamic range of the pixel values may be estimated from the probability distribution.

For example, in the case that the probability distribution is estimated by means of a histogram, the dynamic range can be estimated by examining the distance between the first and last occupied bins.

Also provided is a computer program, comprising computer program code means adapted to perform all the steps of any of the method described above when said program is run on a computer. The computer program may be embodied on a computer-readable medium.

The invention further provides image processing apparatus for contrast enhancement of an image having a plurality of pixels, the apparatus comprising: filtering means, adapted to extract at least one sub-band image from the image, said at least one sub-band image comprising detail information at a predetermined spatial scale; first gain determination means, adapted to determine a first gain value for each pixel, based on pixel values of the image or the at least one sub-band image; and image enhancement means, adapted to generate an enhanced image by applying the first gain values to respective pixels of one or more sub-band images and combining the result with the image, wherein the first gain determination means are adapted to determine the first gain value for each pixel by: estimating a dynamic range of the pixel values in a neighbourhood of that pixel; and setting the first gain value in inverse relation to the dynamic range.

The apparatus further comprises: second gain determination means, adapted to determine a second gain value for each pixel; and gain combination means, adapted to modify the first gain value using the second gain value, wherein the second gain determination means are adapted to: estimate a probability distribution of the pixel values in the neighbourhood of the pixel; and determine the second gain value based on the amplitude of the peak of the probability distribution.

BRIEF DESCRIPTION OF THE DRAWINGS

The invention will now be described by way of example with reference to the accompanying drawings, in which.

DETAILED DESCRIPTION OF THE EMBODIMENTS

Figure 1:
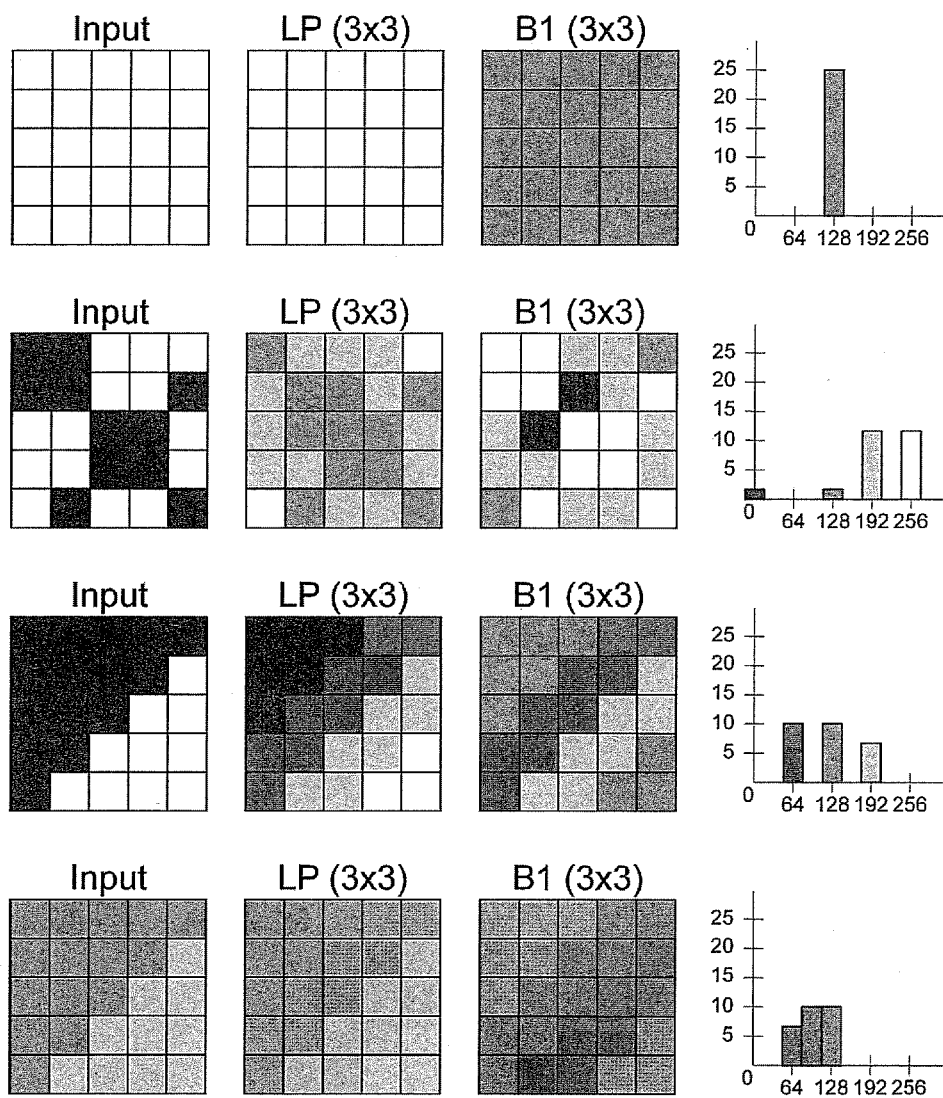
FIG. 1 shows examples of four different image neighbourhoods having different types of contrast.

A contrast enhancement method according to an embodiment of the invention sets a contrast enhancement gain for each pixel based on a statistical analysis of pixel values in a neighbourhood around the pixel. The rows of FIG. 1 show examples of four different pixel neighbourhoods which exhibit different degrees of detail and contrast. In each row, the left-hand column shows the original image neighbourhood. The second column shows the result of low-pass filtering with a simple 3×3 box filter. The third column shows a band-pass filtered version of the original image; and the right-hand column shows the histogram of the band-pass image.

The goal of contrast enhancement is to maximise the visibility of detail in the image, preferably without distorting it or amplifying noise. In FIG. 1, the first row relates to a uniform (homogenous) neighbourhood. For this neighbourhood contrast should not be enhanced, because there is no detail to emphasize. The second row shows a detailed area with high-contrast. This does not need additional enhancement. The third row shows an edge with high contrast and the fourth row shows an edge with lower contrast. The low-contrast edge should be enhanced more than the high-contrast edge.

Figure 2:
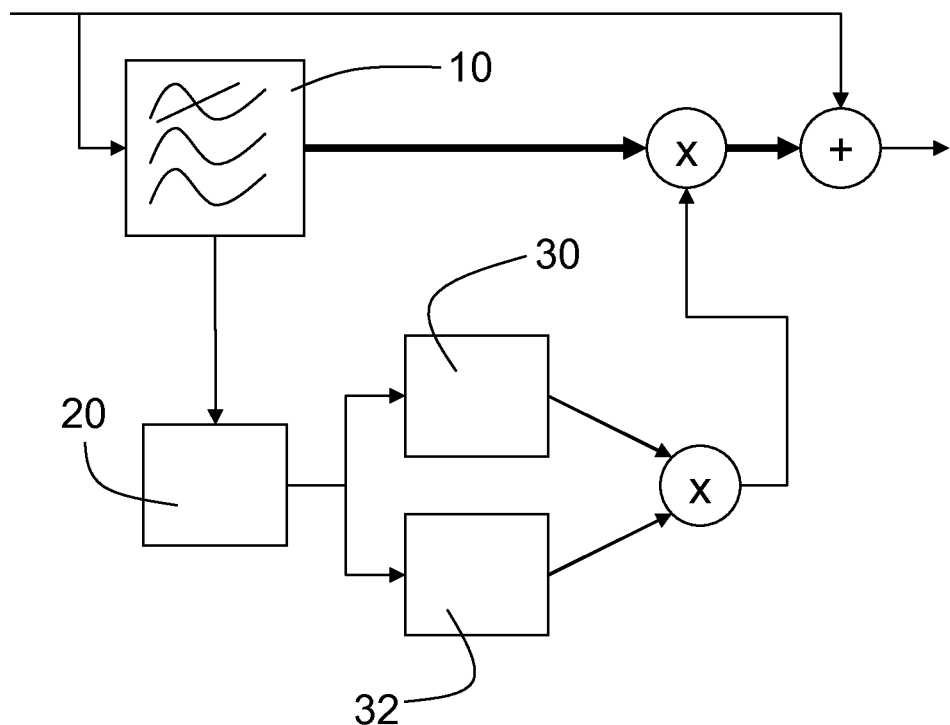
FIG. 2 shows an image processing pipeline implementing a method according to an embodiment.

FIG. 2 shows image processing apparatus operating a according to an embodiment. In this embodiment, a contrast gain or enhancement factor for each pixel in the image is determined from the statistical distribution of band-pass filtered versions of the input image. In particular, the input image is decomposed into a plurality of sub-band images, each of which contains detail information in a different frequency band.

The sub-band decomposition is performed by filter bank 10. In the present embodiment, this is achieved by applying successive low-pass filtering and subtracting the results from one another. The low-pass filter operation is defined by:

$$V_i^{LP} = F_i^{LP} \otimes V_0$$

where $V_0$ is the luminance of the original image, $F_i^{LP}$ is a spatial filter kernel of the low-pass filter for scale i, and $V_i^{LP}$ denotes the low-pass filtered output for scale i. The convolution of the filter kernel with the image is denoted by $\otimes$. The set of low-pass images could alternatively be generated recursively—that is, the output of one low-pass filter being the input to the next low-pass filter. In either case, the low-pass filter could be a smooth kernel such as a Gaussian approximation or it could be a box-filter, which is simpler to implement.

The band-pass (sub-band) images are then obtained as the difference between pairs of successive low-pass images:

$$B_i = V_i^{LP} - V_{i-1}^{LP}$$

This difference signal contains the detail removed at each scale by the low-pass filtering.

For each pixel, the contrast gain is determined from the probability distribution of the pixels in the neighbourhood of that pixel, in one of the band-pass images. Referring to FIG. 2, this step is performed by the probability density estimation block 20, which receives one of the band-pass images from filter bank 10.

A histogram is one suitable way of estimating the probability distribution of the pixels. It provides a non-parametric density estimate from which multiple characteristics can be determined. In this embodiment, the histogram is constructed from the first band-pass image $B_1$:

$$H(k) = \Sigma \{(B_1 + 128) \in w(k - 0.5 \ldots k + 0.5)\}$$

That is, each histogram bin counts the number of pixels in the neighbourhood which fall into the luminance interval represented by that bin. Here k is the bin-number, defining an interval with width w. Note that the band-pass image values may be positive or negative. In this example, the value 128 is added to the band-pass image values to shift them into the range [0,255]. The histogram for each pixel is accumulated in a local window, S, around the pixel. In this example, the histogram has 32 bins and the local window consists of a 21×21 square neighbourhood. In different embodiments, the histogram could be constructed from another band-pass image, or from a combination of band-pass images.

A first gain value is derived from the dynamic range of the pixels in the neighbourhood. This step is performed by the first gain determination block 30. The dynamic range can easily be obtained by examining the occupied bins of the histogram. The distance between the first occupied bin and the last occupied bin is the dynamic range.

The first gain is defined such that the gain value has an inverse relation with the dynamic range. This means that neighbourhoods exhibiting high dynamic range will receive relatively lower gain values. One suitable gain function is defined as follows $$G_1 = \left(\frac{Nbins - (lastbin - firstbin)}{Nbins - 1}\right)^{decay_{G1}}$$

Figure 3:
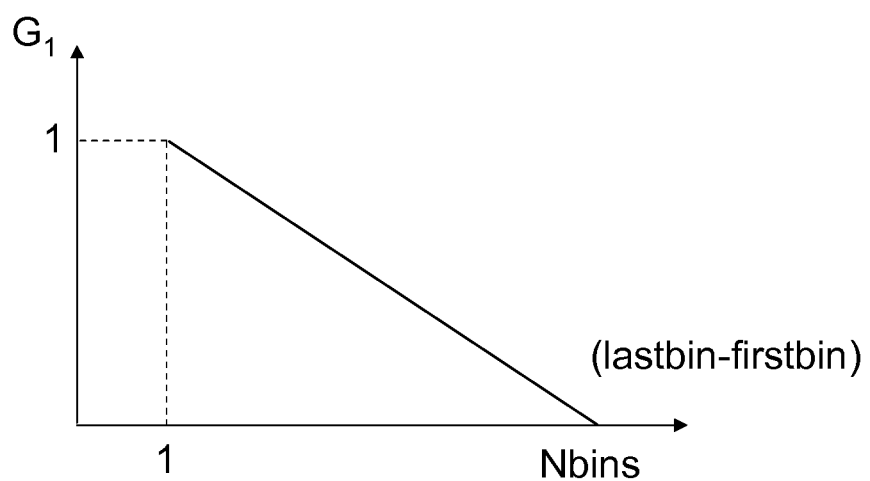
FIG. 3 illustrates a first gain function according to the embodiment.

Firstbin and lastbin are the indices of the non-zero (occupied) bins closest to the ends of the histogram, 0 and Nbins, respectively. The variable $decay_{G1}$ controls the order of the function—that is, the degree to which the gain decreases as dynamic range increases. This function is illustrated in FIG. 3, for the case of first order (linear) decay. For the minimum dynamic range value, the function takes a value of unity, decreasing to zero for the maximum dynamic range.

When estimating the dynamic range, it may be advantageous to ignore outlying pixel values. There may be a small number of pixels whose values are far outside the dynamic range of the majority of pixels in the neighbourhood. These values are not representative of the dynamic range of the whole neighbourhood and may distort the estimate, leading to gain values that are less than optimal for the bulk properties of the neighbourhood. To help avoid this distortion, the step of estimating the dynamic range from the probability distribution preferably comprises neglecting pixel-values having a low probability of occurrence. In the present embodiment, the estimate of dynamic range can be based on the extreme bins of the histogram which are higher than a predetermined occupancy threshold. That is, firstbin and lastbin must contain values higher than a predefined threshold value. This should help to avoid the influence of negligible pixels and noise.

A second gain value is determined by second gain determination means 32. The second gain is based on a measure of the peak of the pixel distribution. In this embodiment it is based on the maximum value in the histogram:

$$H_{max} = \max(H(k))$$

Flat, uniform areas of the input image will have a single sharp peak in their histogram, because all the pixels in the neighbourhood will fall in one bin. Here the maximum value of $H_{max}$=size(S) is achieved, where size(S) is the number of pixels in the neighbourhood. A flat histogram, with $$H_{max} = \frac{size(S)}{Nbins},$$

will be observed when the neighbourhood has the greatest amount of detail and is already high contrast. A prominent edge will result in a bi-modal distribution, and therefore an intermediate value of $H_{max}$.

Based on these observations, the following function is used to define the second gain value:

$$G_2 = \begin{cases} \frac{1 - G_{detail}}{1/2 - 1/Nbins} \times \frac{H_{max}}{size(s) - 1/2} + 1, & \text{if } \frac{H_{max}}{size(s)} < 0.5 \\ -\left(\frac{H_{max} - size(s)/2}{size(s)/2}\right)^{decay_{G2}} + 1, & \text{if } \frac{H_{max}}{size(s)} \geq 0.5 \end{cases}$$

Figure 4:
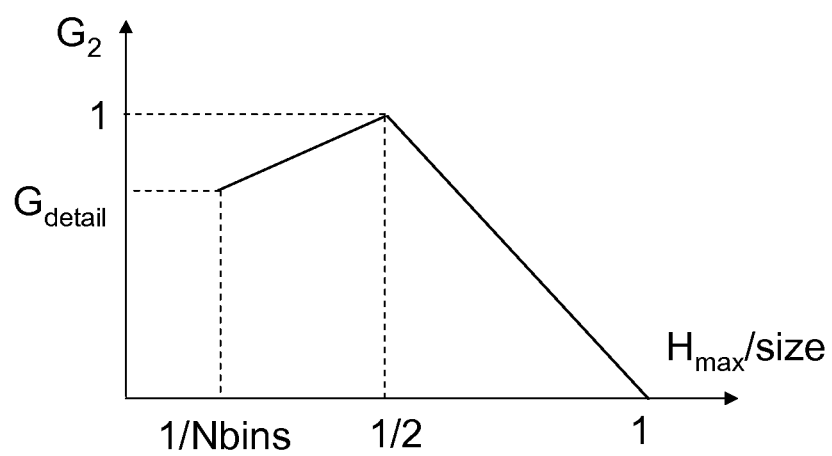
FIG. 4 illustrates a second gain function according to the embodiment.

This is a function of the ratio of $H_{max}$ to size(S)—that is, the proportion of pixels in the neighbourhood which fall in the most popular bin. The function is illustrated in FIG. 4, for $decay_{G2}$=1 (linear decay). For the minimum peak ratio, 1/Nbins, the function returns an intermediate value of gain $G_{detail}$. This rises linearly to reach a maximum value of unity when the peak ratio $$\frac{H_{max}}{size(s)} = 1/2.$$

It then decays according to the decay order, $decay_{G2}$, to reach zero at the maximum value of the peak ratio, which corresponds to all the pixels falling in one histogram bin. This gain function allocates the greatest gain value in the neighbourhood of an edge (which is assumed to have an intermediate value of $$\frac{H_{max}}{size(s)}).$$

Note that conventional wisdom would suggest that the highest gain should be reserved for a flat histogram, because this indicates the presence of a large amount of detail information to be amplified. However, the present inventors have recognised that this approach can cause thin lines to be enhanced more than intensity transitions, such as edges, and that this can cause undesirable artifacts.

In embodiments, the first and second gain functions described above can be implemented by means of the equations as written. That is, the values for each gain can be computed at run-time. This has the advantage that the parameters of the functions can be easily changed, or made dependent on other variables. Alternatively, the gain functions can be implemented as look-up tables (LUTs). The use of histograms lends itself to this implementation, because the estimate of dynamic range, for example, is already quantised into a relatively small number of values by the binning.

The first and second gain values for each pixel are combined. This is indicated in FIG. 2 by multiplication. By calculating the product of the gains, each one modulates the other, so that both gains must be significant to produce a high combined gain. This helps to avoid over-enhancement, since the first and second gain function can independently identify different circumstances in which the enhancement factor should be lowered.

The combined gain is then applied to the sub-band images output by the filter bank 10, also by multiplication. Each sub-band may have an intrinsic fixed gain applied in addition. Finally, the weighted sub-band images are added to the original (input) image, to generate an enhanced image. These calculations can be defined by the following equations. First, the total gain to be applied is calculated as:

$$G_i' = G_1 G_2 G_{B_i}$$

Here $G_{B_i}$ is the fixed gain to be applied to sub-band $B_i$. The contrast-enhanced output image is generated according to:

$$O = V_0 + \sum_i B_i G_i'$$

Figure 5:
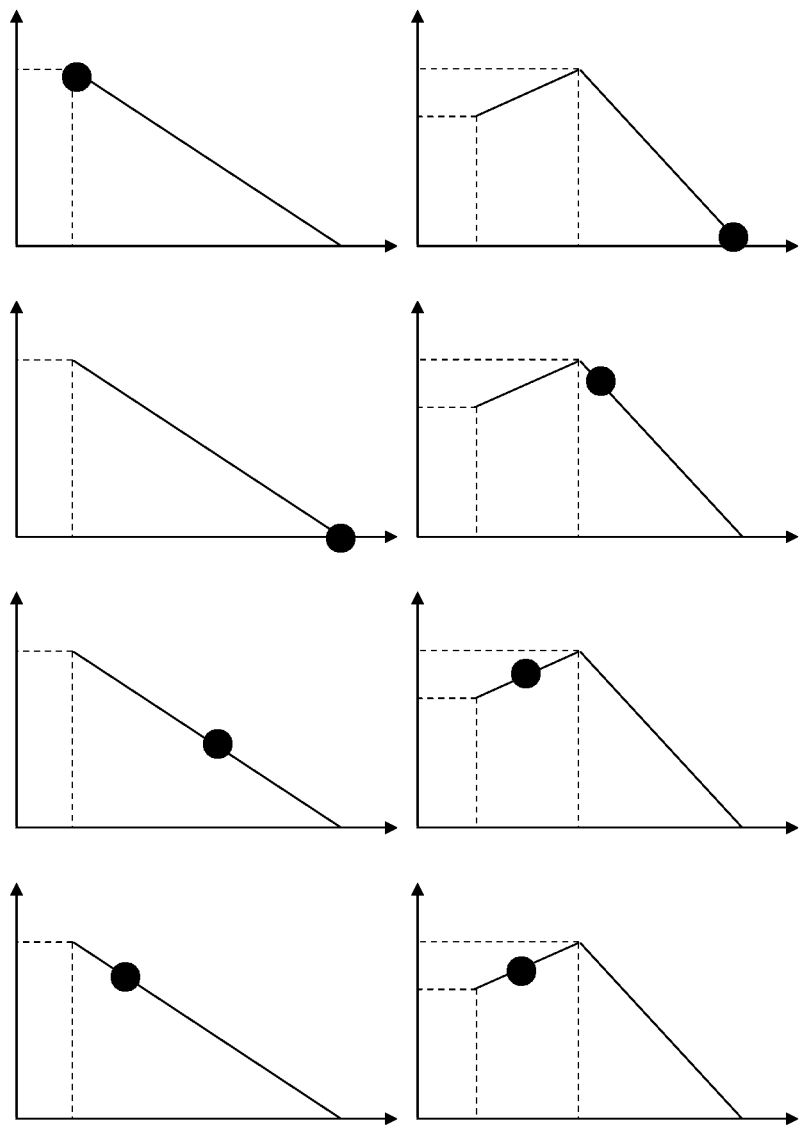
FIG. 5 illustrates in principle how gains are determined for the neighbourhoods of FIG. 1, according to the gain functions of FIGS. 3 and 4.

FIG. 5 illustrates examples of the first and second gain values that would be derived for the four neighbourhoods of FIG. 1. The left-hand column shows the first gain function and the right-hand column shows the second gain function.

The first neighbourhood is uniform; therefore, the dynamic range is zero and the first gain function sets the first gain value at unity. However, because of the uniformity, all the pixels fall in one bin of the histogram. This results in the maximum peak amplitude ratio and therefore a zero value of the second gain. The combined gain is therefore zero, which is correct, because smooth (uniform) areas should not be enhanced.

The second row corresponds to the case of high detail and contrast. Here, the dynamic range is very wide, and so the first gain value is minimal. The peak of the histogram is at an intermediate level, and so the second gain value is relatively high. However, the combined gain is again low, which is correct, to avoid over enhancement.

The third row shows a high-contrast edge. The second gain value is high, because the histogram does not have a very sharp peak. The dynamic range is reasonably high, however, which reduces the overall gain.

The fourth row shows an example for an edge with lower contrast than the third row. The peak value of the histogram is similar to that in the third row, so the second gain value is largely unchanged. However, because the dynamic range is less, the first gain function produces a higher value. This leads to increased overall gain, as compared with the second row.

Methods according to embodiments can be implemented in a variety of ways, according to the application. For contrast enhancement of video signals—for example, in a display device—a hardware pipeline implementation such as that of FIG. 2 may be appropriate. Here, signal processing elements such as the filter bank, the first and second gain determination means, and the gain combination an image enhancement means (the multipliers and adder for generating the enhanced image) can be implemented as circuits in an ASIC or FPGA.

Alternatively, a suitably programmed digital signal processor or general purpose computer processor can be used to implement the method. In this case, the elements of FIG. 2 represent the logical process flow executed by the processor, rather than physical hardware components. Such a software implementation of the invention may be appropriate for image enhancement software in a personal computer. It may also be suitable for embedded implementation in devices such as digital cameras or camera-phones, which already include a general purpose microprocessor or a digital signal processor.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the contrast enhancement is applied to signals other than luminance. If the input image data is in a different colour space (such as RGB), the contrast enhancement could be applied to those signals instead.

In the embodiment described above, successive low-pass filtering and differencing (unsharp filtering) was used to extract the sub-band images. However, many alternatives to this are possible. For example, a wavelet transform could be used to extract sub-band images. Non-linear methods such as morphological filtering may also be another appropriate alternative.

As will be apparent to the skilled person, the extraction of multiple sub-band images is optional. It is merely one conveniently implemented embodiment. For example, if the output image is defined as a linear summation of the outputs of different linear filters (as in the main embodiment described above), a single, more complex, equivalent filter could be defined, which takes the place of the filter bank. This equivalent filter would also take into account the fixed gain applied to each sub-band filter, as necessary.

Note also that the sub-band image analysed to determine the gain values may be the same as or different from the sub-band images to which the gain values are applied when generating the enhanced image.

Alternatively, the statistics for determining the gains could be derived directly from the input image.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A contrast enhancement method for an image having a plurality of pixels, the method comprising:
    extracting at least one sub-band image from the image, comprising detail information at a predetermined spatial scale;
    determining a first gain value for each pixel, based on pixel values of one of the image and the at least one sub-band image;
    determining a second gain value for each pixel;
    modifying the first gain value for each pixel using the respective second gain value; and
    generating an enhanced image by applying the modified first gain values to respective pixels of at least one sub-band image and combining the result with the image,
    wherein determining the first gain value for each pixel comprises:
    estimating a dynamic range of the pixel values in a neighbourhood of that pixel; and
    setting the first gain value in inverse relation to the dynamic range, and
    wherein determining the second gain value for each pixel comprises:
    estimating a probability distribution of the pixel values in the neighbourhood; and determining the second gain value based on the amplitude of the peak of the probability distribution.

2. The method of claim 1, wherein the first gain value for each pixel is determined based on pixel values of the at least one sub-band image.

3. The method of claim 1, wherein the second gain value is determined such that:
 a maximum gain is set when the amplitude of the peak is at an intermediate level;
 a minimum gain is set when the amplitude of the peak is at a maximum level; and
 an intermediate gain value is set when the amplitude of the peak is at a minimum level.

4. The method of claim 1, wherein the estimate of the probability distribution comprises a histogram.

5. The method of claim 1, wherein the dynamic range of the pixel values is estimated from the probability distribution.

6. A non-transitory computer readable storage medium storing a computer program comprising computer program code which when executed by a processor, adapted to perform:
 extracting at least one sub-band image from the image, comprising detail information at a predetermined spatial scale;
 determining a first gain value for each pixel, based on pixel values of one of the image and the at least one sub-band image;
 determining a second gain value for each pixel;
 modifying the first gain value for each pixel using the respective second gain value; and
 generating an enhanced image by applying the modified first gain values to respective pixels of at least one sub-band image and combining the result with the image,
 wherein determining the first gain value for each pixel comprises:
 estimating a dynamic range of the pixel values in a neighbourhood of that pixel; and
 setting the first gain value in inverse relation to the dynamic range, and
 wherein determining the second gain value for each pixel comprises:
 estimating a probability distribution of the pixel values in the neighbourhood; and
 determining the second gain value based on the amplitude of the peak of the probability distribution.

7. The storage medium of claim 6, wherein the first gain value for each pixel is determined based on pixel values of the at least one sub-band image.

8. The storage medium of claim 6, wherein the second gain value is determined such that:
 a maximum gain is set when the amplitude of the peak is at an intermediate level;
 a minimum gain is set when the amplitude of the peak is at a maximum level; and
 an intermediate gain value is set when the amplitude of the peak is at a minimum level.

9. The storage medium of claim 6, wherein the estimate of the probability distribution comprises a histogram.

10. The storage medium of claim 6, wherein the dynamic range of the pixel values is estimated from the probability distribution.

11. Image processing apparatus for contrast enhancement of an image having a plurality of pixels, the apparatus comprising:
 filtering means, adapted to extract at least one sub-band image from the image, said at least one sub-band image comprising detail information at a predetermined spatial scale;
 first gain determination means, adapted to determine a first gain value for each pixel, based on pixel values of one of the image and the at least one sub-band image;
 second gain determination means, adapted to determine a second gain value for each pixel;
 gain combination means, adapted to modify the first gain value using the second gain value; and
 image enhancement means, adapted to generate an enhanced image by applying the modified first gain values to respective pixels of at least one sub-band image and to combine the result with the image,
 wherein the first gain determination means are adapted to determine the first gain value for each pixel by:
 estimating a dynamic range of the pixel values in a neighbourhood of that pixel; and
 setting the first gain value in inverse relation to the dynamic range, and
 wherein the second gain determination means (32) are adapted to:
 estimate a probability distribution of the pixel values in the neighbourhood of the pixel; and
 determine the second gain value based on the amplitude of the peak of the probability distribution.

* * * * *